US007305559B2

(12) United States Patent
Schreiber et al.

(10) Patent No.: US 7,305,559 B2
(45) Date of Patent: *Dec. 4, 2007

(54) SOFTWARE METHOD FOR IMPROVED PASSWORD ENTRY

(75) Inventors: Graeme G. Schreiber, Scotland (GB); Andrew R. Knox, Scotland (GB)

(73) Assignee: Lenovo Singapore Pte Ltd., Singapore (SG)

(*) Notice: Subject to any disclaimer, the term of this patent is extended or adjusted under 35 U.S.C. 154(b) by 777 days.

This patent is subject to a terminal disclaimer.

(21) Appl. No.: 10/727,372

(22) Filed: Dec. 4, 2003

(65) Prior Publication Data

US 2004/0143767 A1    Jul. 22, 2004

(30) Foreign Application Priority Data

Dec. 19, 2002  (GB) ................................. 0229727.3

(51) Int. Cl.
H04L 9/00 (2006.01)
H04K 1/00 (2006.01)
(52) U.S. Cl. ............... 713/182; 713/167; 713/168; 713/183; 713/186; 726/17; 726/18; 726/19; 726/22; 382/115; 382/116; 382/117; 382/118
(58) Field of Classification Search ........ 382/115–118, 382/124–125, 181–182, 187, 188–189; 725/9, 725/11, 13, 19, 25, 37; 713/167–168, 182–186; 705/57–58, 67, 75–76, 18, 42–44, 405; 726/17–19, 726/22, 25–27, 30
See application file for complete search history.

(56) References Cited

U.S. PATENT DOCUMENTS

| 4,621,334 | A  | * | 11/1986 | Garcia ..................... 382/115 |
| 4,805,222 | A  | * | 2/1989  | Young et al. ............... 382/115 |
| 6,151,593 | A  | * | 11/2000 | Cho et al. .................... 706/16 |
| 6,202,055 | B1 | * | 3/2001  | Houvener et al. ............ 705/44 |
| 6,405,922 | B1 | * | 6/2002  | Kroll ......................... 235/379 |
| 6,442,692 | B1 | * | 8/2002  | Zilberman .................. 713/184 |
| 6,817,520 | B2 | * | 11/2004 | Kroll ......................... 235/380 |
| 6,895,514 | B1 | * | 5/2005  | Kermani ..................... 726/19 |
| 6,954,862 | B2 | * | 10/2005 | Serpa ........................... 726/5 |
| 7,043,640 | B2 | * | 5/2006  | Pritchard et al. .......... 713/184 |
| 7,206,938 | B2 | * | 4/2007  | Bender et al. .............. 713/186 |

OTHER PUBLICATIONS

Joyce et al. Identity Authentication Based on Keystroke Latencies, ACM 1990, pp. 168-176.*
Monrose et al. Authentication via Keystroke Dynamics, ACM 1997, pp. 48-56.*
Monrose et al., Keystroke dynamics as a biometric for authentication, pp. 351-359.*

* cited by examiner

*Primary Examiner*—Kim Vu
*Assistant Examiner*—Beemnet W Dada
(74) *Attorney, Agent, or Firm*—Rogitz & Associates; Carlos Munoz-Bustamante

(57) ABSTRACT

A software method of authentication is described that uses both relative and absolute values of inter-keystroke intervals measured during entry of a unique identifier. Both the relative and absolute values have to be achieved during entry of the unique identifier. The relative values are the ratio of each of the inter-keystroke intervals divided by one of the inter-keystroke intervals or divided by the average inter-keystroke interval.

2 Claims, 10 Drawing Sheets

SOFTWARE METHOD FOR IMPROVED PASSWORD ENTRY

BACKGROUND OF THE INVENTION

1. Field of the Invention

The present invention relates generally to the entry of passwords, codes or identification numbers into data processing systems, Automated Teller Machines (ATMs), locks, or other security or access control type devices. More particularly, the invention relates to the checking of the rhythm and tempo used for entry of the password, code or identification number.

2. Description of Related Art

It is known that IBM Technical Disclosure Bulletin v 30, n.5, October 1987, p.258, entitled *"Passwords for Computer Systems and Cipher Locks Containing Rhythm Patterns"* discloses the use of a password with timing constraints such as the pauses between key-presses or the duration of the key-press being added. The pauses or duration are pre-defined and may be either "long" or short" and may be either relative to each other or absolute values.

U.S. Pat. No. 4,621,334 discloses a personal identification apparatus in which a mean time between keystrokes is used to determine whether a person attempting to gain access is the person who should be granted access to the system.

U.S. Pat. No. 4,805,222 discloses a method of verifying a person's identity by measuring the average inter-character time between successive pairs of keystrokes and comparing this with a pre-stored sample.

U.S. Pat. No. 5,557,686 discloses a user verification system in which vectors are constructed from user inputted samples and a neural network is used to determine whether the user inputted samples are similar to a sample entered for user verification.

U.S. Pat. No. 5,721,765 discloses a security system in which digits of an identification number are separated into two or more groups that must be entered with a predetermined time delay between each of the two or more groups.

U.S. Pat. No. 6,151,593 discloses a neural network which compares a timing vector extracted from the keystrokes a user has typed in with a training set to authenticate the identity of the user.

It would be desirable to allow entry of a password, code or identification number according to a rhythm and tempo defined by the user entering the password, code or identification number during a learning period.

SUMMARY OF THE INVENTION

Accordingly the invention provides a software method of authenticating a user where the method comprises: providing a user unique identifier, the unique identifier comprising both a sequence of keystrokes and the inter-keystroke intervals associated with provision of those keystrokes; comparing the unique identifier provided by the user with a reference unique identifier by: comparing the absolute inter-keystroke intervals of the unique identifier with the absolute inter-keystroke intervals of the reference unique identifier and returning a true indication if the absolute inter-keystroke interval of the unique identifier is within a predetermined tolerance of the absolute inter-keystroke interval of the reference identifier; comparing the relative inter-keystroke intervals of the unique identifier with the relative inter-keystroke intervals of the reference unique identifier and returning a true indication if the relative inter-keystroke interval of the unique identifier is within a predetermined tolerance of the relative inter-keystroke interval of the reference identifier; authenticating said user if both said absolute comparison step and said relative comparison step return a true indication.

The invention has the advantage that both the absolute inter-keystroke interval and the relative inter-keystroke interval are compared and if the two comparisons are sufficiently close, that is, within a predetermined tolerance, then the comparison is true. In this way a user can add a rhythm and a tempo to the way in which they enter the unique identifier.

In a preferred embodiment, the relative inter-keystroke intervals are the ratio of the inter-keystroke intervals and the inter-keystroke interval between entry of the first of said sequence of keystrokes and the second of said sequence of keystrokes. The use of the relative inter-keystroke intervals being calculated as relative to the first inter-keystroke interval provides for simple computation of the required relative ratios.

In a preferred embodiment, the method further comprises the step of entry by the user of the reference unique identifier and wherein said predetermined tolerance is determined during said step of entry by the user of the reference unique identifier. This allows the method to determine the most appropriate tolerance from the initial entry of the reference unique identifier. The tolerance must be sufficiently large that authentication is not refused due to minor variations in entry of the unique identifier, but also that authentication is not given when the unique identifier is not entered by the authorized user.

In a further aspect of a preferred embodiment, said predetermined tolerance is explicitly set by the user. In some applications, it may be determined that a particular tolerance should be used and that the user should achieve this tolerance in order for the unique identifier to be accepted. For example, if during entry of the reference unique identifier, there is a large variation in the relative or absolute values of the inter-keystroke intervals, then that would allow future entry of the unique identifier with a large tolerance. It may be desirable to limit the tolerance or to explicitly set the tolerance.

The invention provides a computer program comprising computer program code means adapted to perform the steps of any one of the methods described above.

As used herein, "rhythm" is intended to mean absolute measures of the time interval between the entry of each character or number of the password and password is taken to mean a password, code or identification number. That is, for example, if the characters being entered are "fred", then the interval between entering each of characters "f" and "r" might be 203 milliseconds (mS), the interval between entering each of characters "r" and "e" might also be 203 mS, and the interval between entering each of characters "e" and "d" might be 156 mS.

Also, as used herein, "Rhythm Tolerance" is intended to mean the variation from these absolute values that are permitted for the rhythm of the entry of the password, code or identification number to be accepted. For example, using the intervals mentioned above, with a Rhythm Tolerance of 25%, a range of 153 mS to 253 mS (203 mS plus or minus 25%) might be acceptable for the interval between entering "f" and "r" and a range of 117 mS to 195 mS (156 mS plus or minus 25%) might be acceptable for the interval between entering "e" and "d".

Further, as used herein, "tempo" is intended to mean relative measures of the time interval between the entry of each character or number of a password, code or identification number.

Also, as used herein, "Tempo Tolerance" is taken to mean the variation from these Tempo (relative) values that are permitted for the rhythm of the entry of the password, code or identification number to be accepted.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
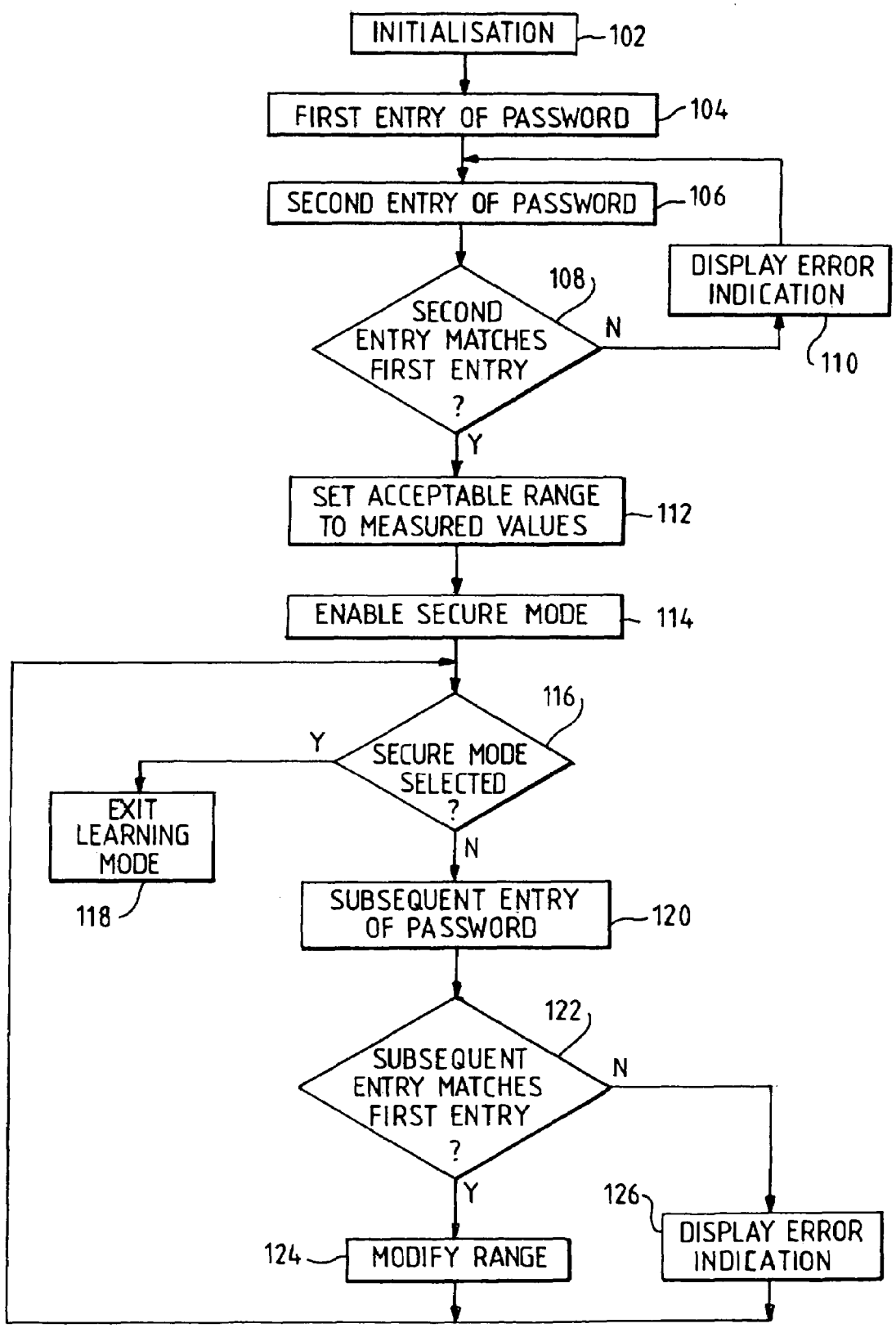
FIG. 1 is a flow diagram of a learning mode of an embodiment of the present invention.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Reference herein to "one embodiment" or "an embodiment" means that a particular feature, structure, or characteristic described in connection with the embodiment can be included in at least one embodiment of the invention, but not necessarily in all. The appearances of the phrase "in one embodiment" in various places in the specification, sequentially or otherwise, does not necessarily indicate that each phrase refers to or is used in reference to the same embodiment, nor are separate or alternative embodiments mutually exclusive of other embodiments. The description herein is largely based on a particular method as developed by the inventors identified above. Those skilled in the art will appreciate that the description can be equally applied to other methods involving security, passwords and the like.

When a password, code or identification number is entered into a system by a user, there is typically a rhythm associated with the entry of the characters or numbers of the password, code or identification number.

If the rhythm aspect of password entry is to be used, the system into which the password is entered must learn the rhythm associated with a password when it is first entered. The system does this by having a Learning Mode in which the password is entered and the rhythm is learnt. This might be a single entry of the password, but is preferably at least three entries of the password in order to allow for variation in entry of the password. Once the password has been learned, a Secure Mode is used, in which the password is entered and checked.

Figure 2:
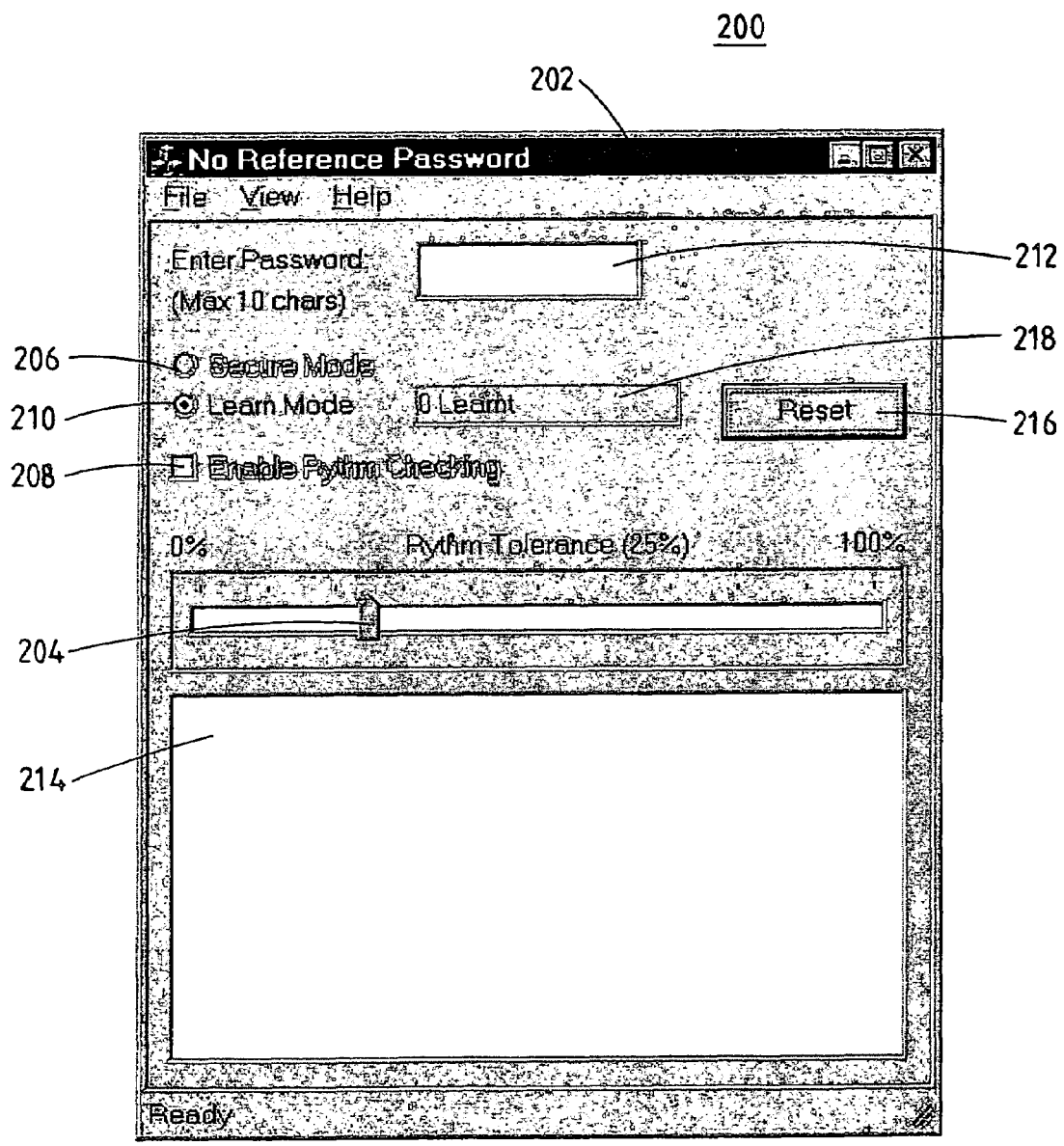
FIG. 2 is a screen image at step 102 of FIG. 1.

FIG. 1 shows a flow diagram of a Learning Mode of a first embodiment of the present invention. At step 102 (initialization), a program window (shown in FIG. 2) is created on the screen. Referring to FIG. 2, the program window 200 has a window title 202 of "No Reference Password". A Rhythm Tolerance slider 204 is set to an initial value of 25%. Push-button 210 identifies that this is a Learn Mode. Push-button 206 to enter Secure Mode and tick-box 208 to Enable Rhythm Checking are initially disabled. The Enter Password window 212 is initially blank, ready for entry of a password. The message window 214 is initially empty.

Figure 3:
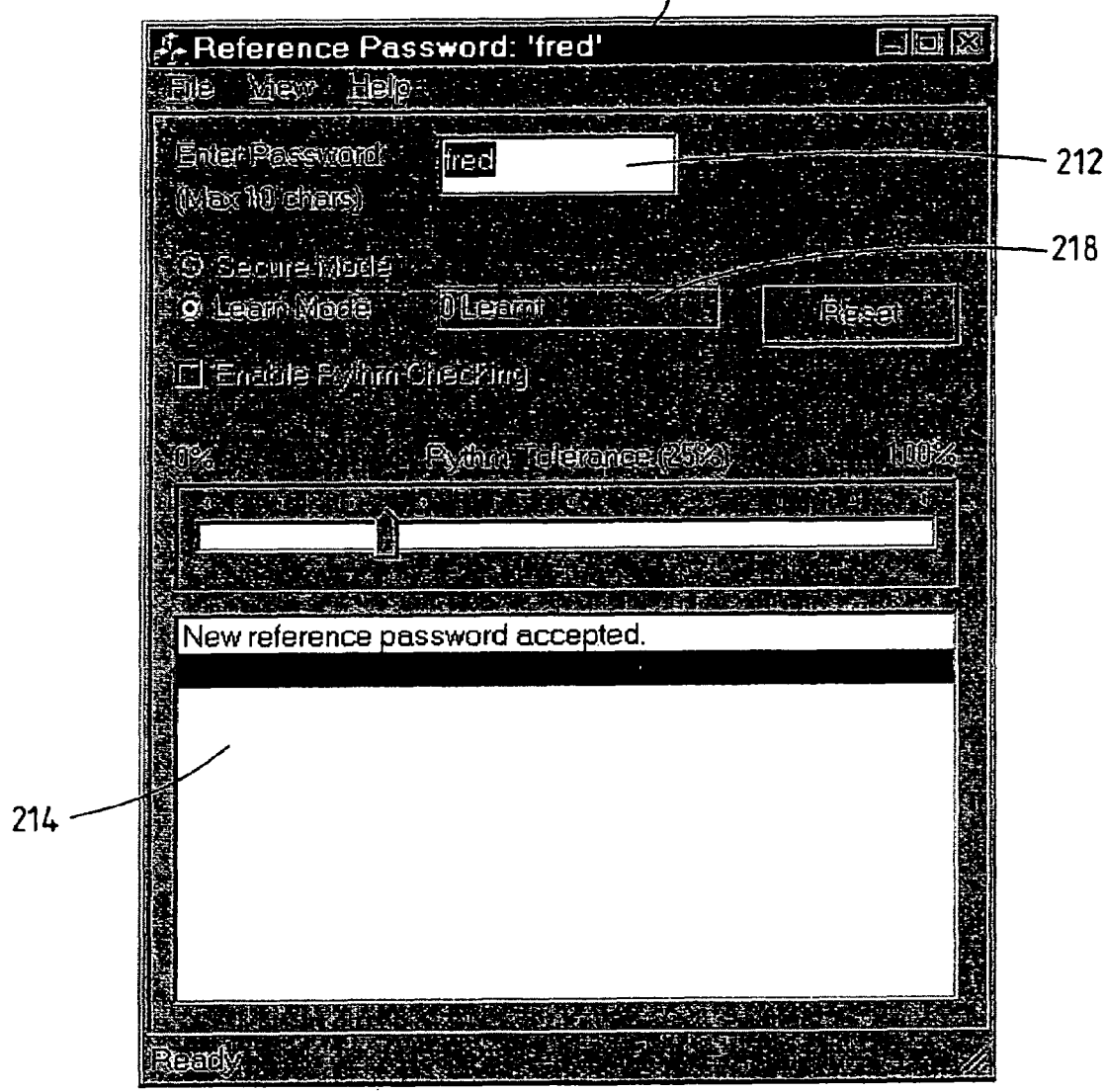
FIG. 3 is a screen image after step 104 of FIG. 1.

At step 104 of FIG. 1, a first entry of a password is made. In the screen shot of the exemplary embodiment shown in FIG. 3, the window title 302 is now Reference Password: 'fred', since the password entered was "fred". A message is displayed in the message box 214 which says "New reference password accepted. The password that was typed in appears in the Enter Password window 212 and learn count window 218 has the text "0 Learnt" displayed in it because although one password entry has been made, this has been used to determine what characters or numbers the password consists of. In alternative embodiments, this first entry of the password could be used as part of the learning process.

Figure 4:
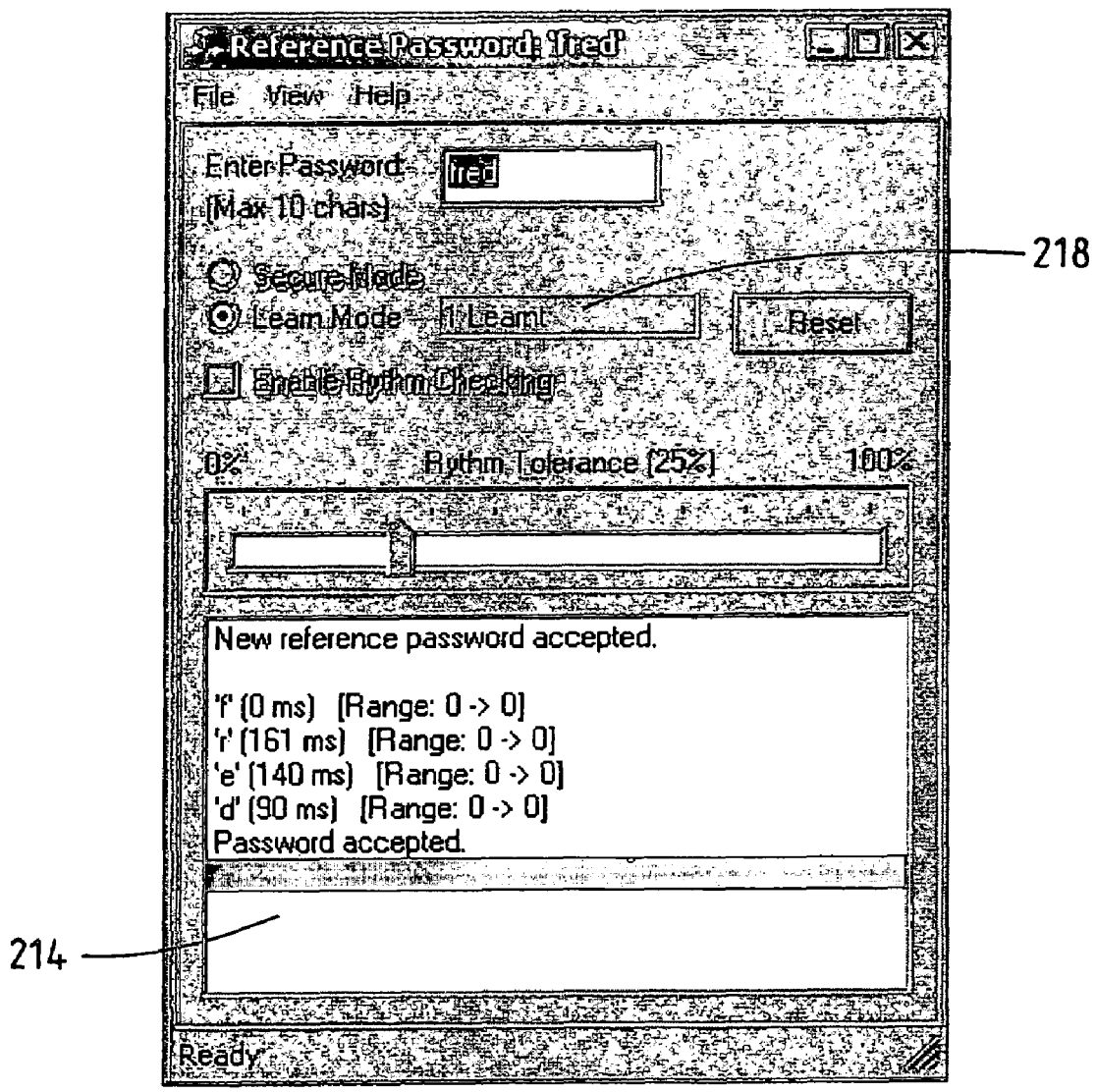
FIG. 4 is a screen image after step 106 of FIG. 1.

At step 106 of FIG. 1, a second entry of the password is made. FIG. 4 shows a screen shot taken after the second entry of the password has been made. As each character of the password is entered, it is displayed in the message box 214 with the elapsed time interval between entry of each character in ms shown. Additionally, an acceptable range of time intervals computed using the rhythm tolerance may be shown. In the example of FIG. 4, this is not shown until a third entry of the password had been made, although this is not an essential feature of the invention and it could be shown after a first entry, or a second entry or a subsequent entry of the password.

When the Enter key or another key representing completion of the password entry process is pressed, then processing moves to step 108 of FIG. 1. If the second entry of the password matched the first entry of the password, the words "Password accepted." are displayed and the learn count window 218 now displays a learn count of 1. Processing moves to step 112 of FIG. 1 where an acceptable range of rhythm values is set. As an example, the message window of a subsequent entry might show:

'f' (0 ms) [Range: 0->0] PASS
'r' (265 ms) [153->253] FAIL (Slow)
'e' (203 ms) [153->253] PASS
'd' (157 ms) [117->195] PASS
Password accepted.

In the example above, the acceptable rhythm range has been set between 153 ms and 253 ms for the time interval between entry of "f" and "r", that is the time interval for the initial entry with a 25% tolerance applied. Similarly, for the time interval between entry of "r" and "e" and for "e" and "d", where the ranges are 153 ms to 253 ms and 117 to 195 ms respectively. The time interval between entry of "f" and "r" was outside the acceptable range and so failed for that entry. The time intervals between entry of "r" and "e" and for "e" and "d" were within the acceptable ranges for those time intervals and so passed for those entries.

Figure 5:
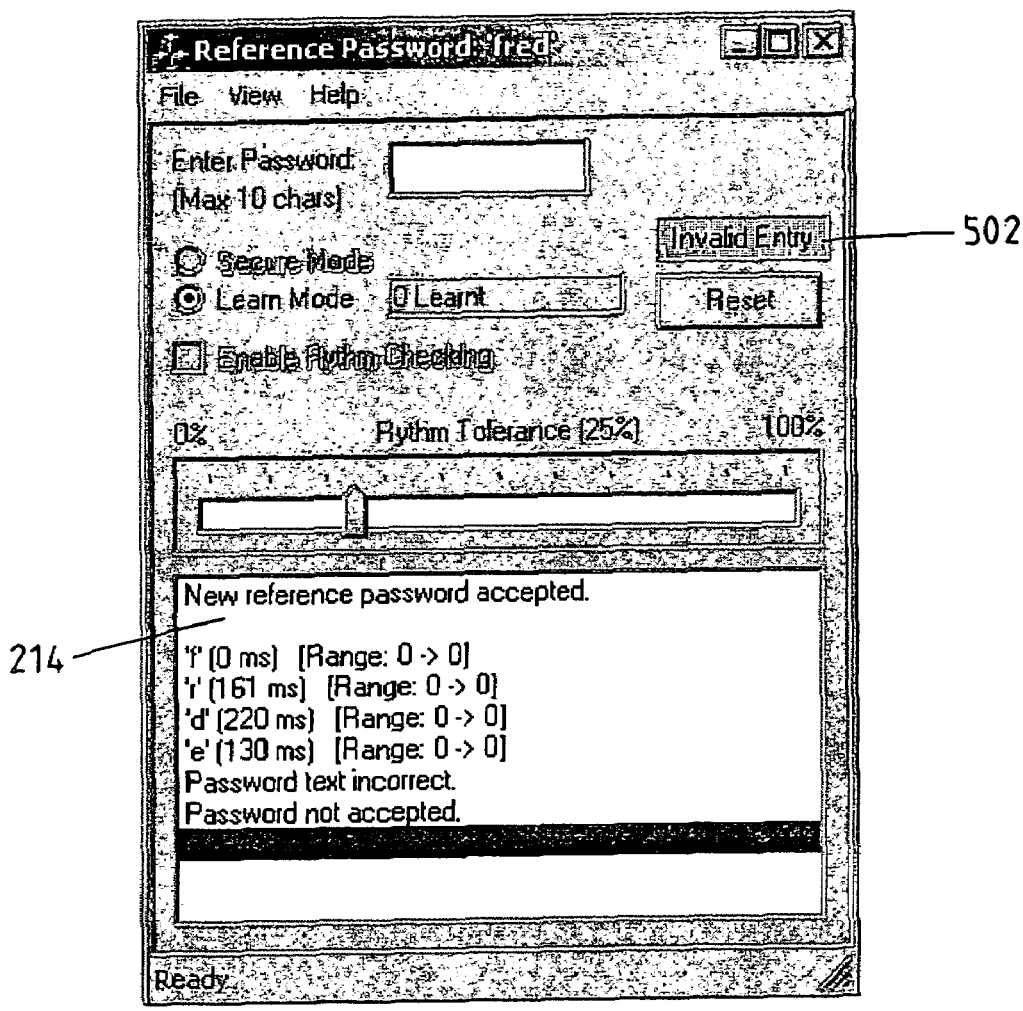
FIG. 5 is a screen image of the error indication displayed at step 110 of FIG. 1.

However, if the second entry of the password does not match the first entry of the password, processing passes to step 110 of FIG. 1. FIG. 5 shows a screen shot taken after an incorrect second entry of the password has been made. Preferably, the words "Password text incorrect." and "Password not accepted." are displayed in the message window 214 and the learn count displayed in the learn count window 218 is not incremented. An "Invalid Entry" indication 502 is displayed in the program window 500.

Once sufficient entries of the correct password have been made for a valid acceptable rhythm range to be determined, then at step 114 of FIG. 1, a Secure Mode is enabled and the push-button 206 for the Secure Mode may be selected. At step 116 of FIG. 1, a check is made as to whether the Secure Mode has been selected. If the Secure Mode has been selected, then the Learning Mode is exited at step 118 of FIG. 1 and the Secure Mode (described later with reference to FIG. 6) is entered.

If the Secure Mode is not selected, then subsequent entries of the password can be made at step 120 of FIG. 1. At step 122 of FIG. 1a test is done to see if a subsequent entry matches the first entry. If a subsequent entry does match a first entry, then at step 124 of FIG. 1 the acceptable range is modified to take into account the values of the subsequent entry and processing returns to step 116 of FIG. 1. If a subsequent entry does not match the first entry, then an error indication is displayed at step 126 before processing returns to step 116 of FIG. 1.

Figure 6:
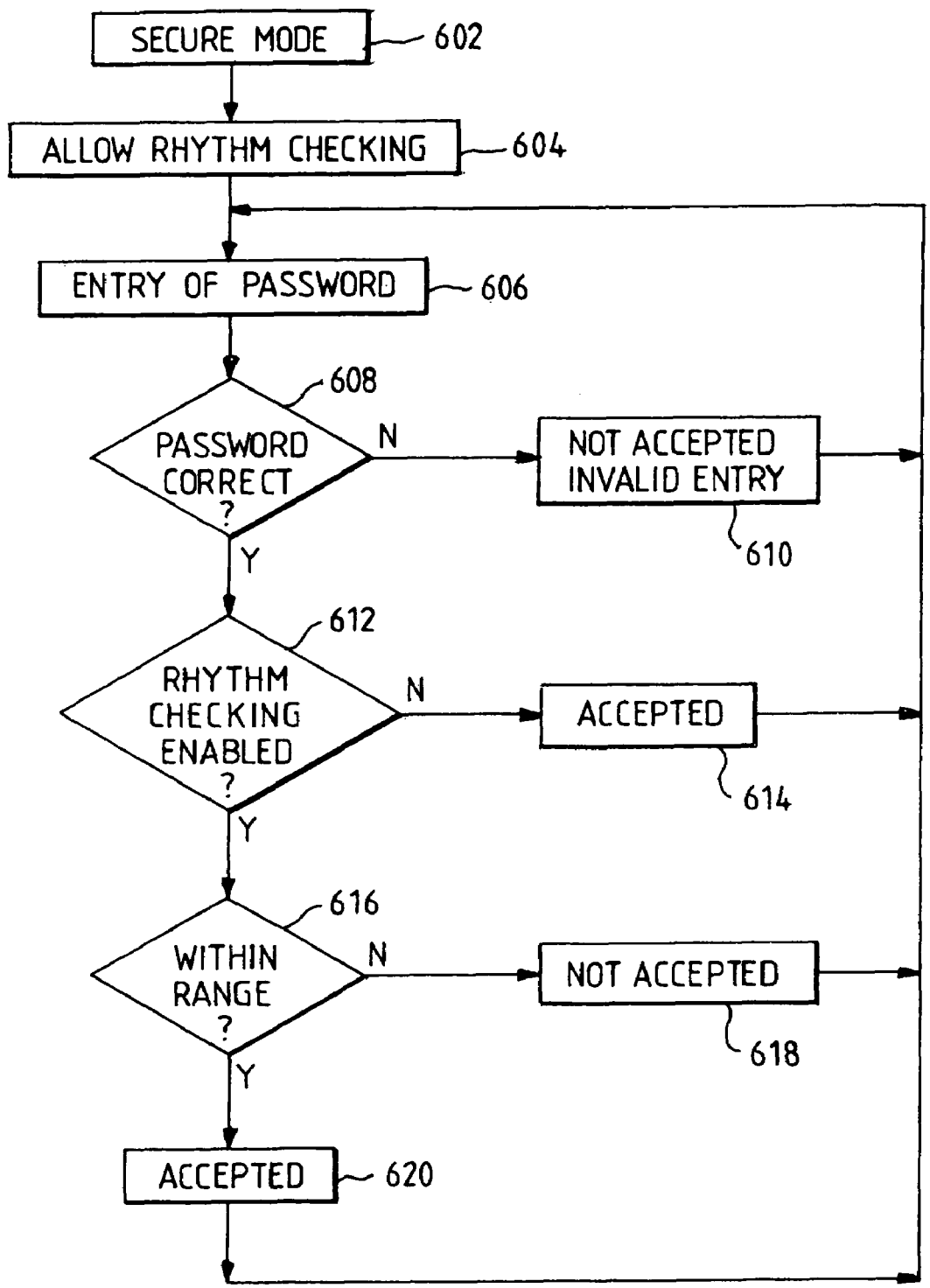
FIG. 6 is a flow diagram of a secure mode of an embodiment of the present invention.
Figure 7:
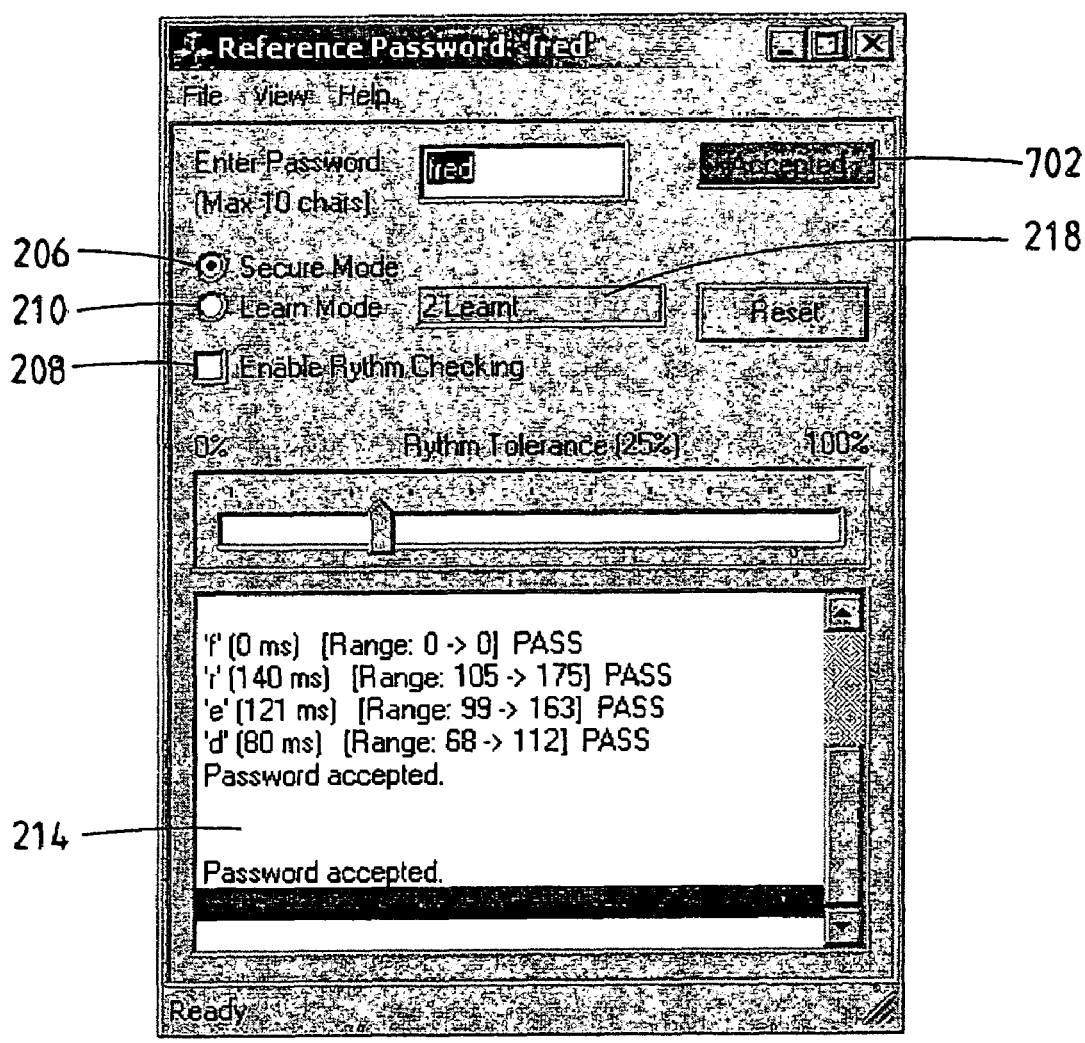
FIG. 7 is a screen image of the error indication displayed at step 614 of FIG. 6.

Referring now to FIG. 6 which shows a flow diagram of a Secure Mode. A secure mode is entered at step 602. Rhythm checking is allowed, although not enabled at step 604. This is achieved in the exemplary embodiment by allowing selection of the tick box (208 in FIG. 7) but not having the tick box ticked by default. At step 606, the password is entered by the user.

Figure 8:
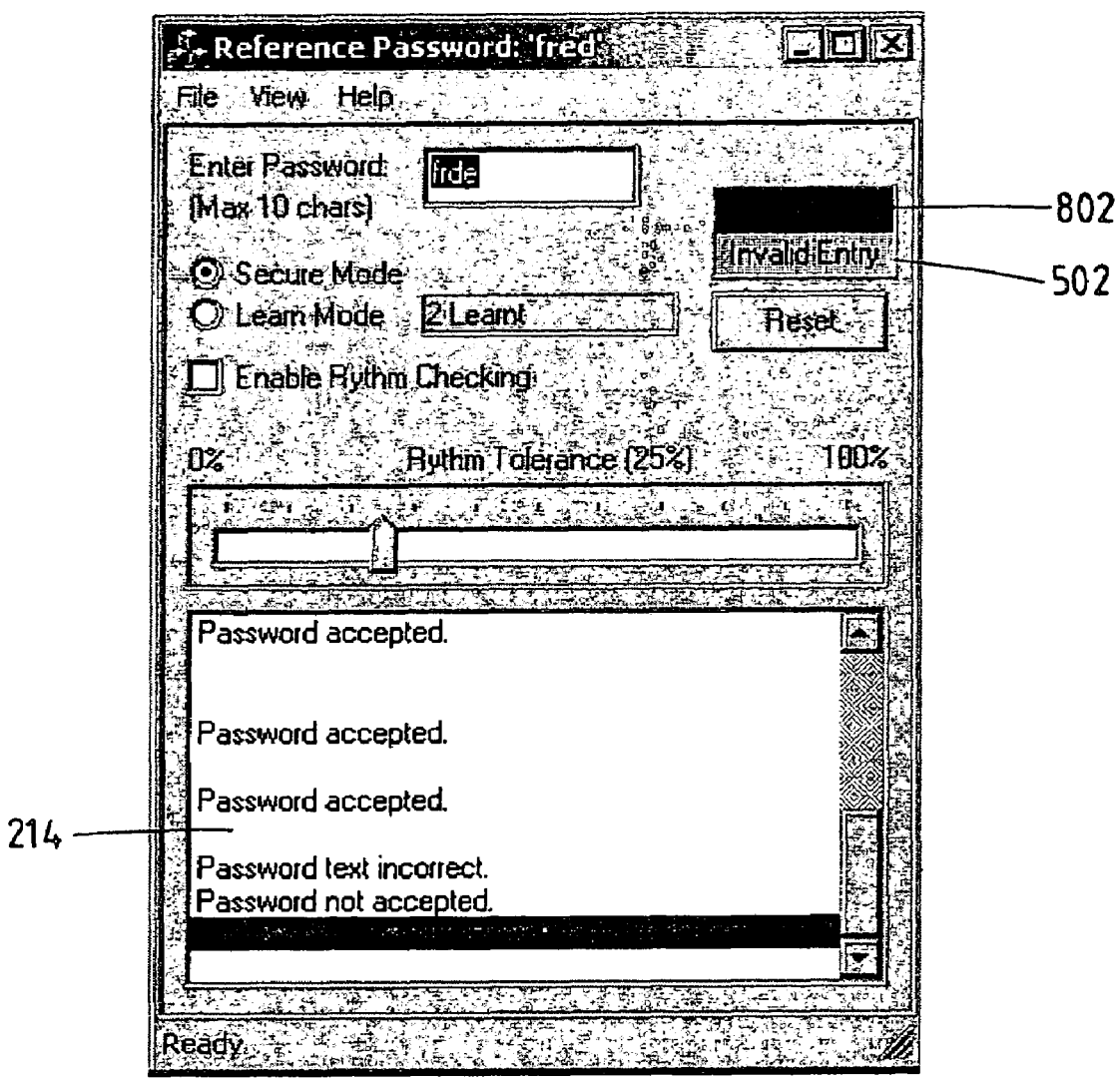
FIG. 8 is a screen image of the error indication displayed at step 610 of FIG. 6.

At step 608, a check is made as to whether or not the password text is correct. If the password text is not correct, then "Password text incorrect" and "Password not accepted" messages are displayed in the message box (214 in FIG. 8) and an indication (502 in FIG. 8) is provided that the password is an invalid entry and an indication (802 in FIG. 8) is provided that the password is not accepted. Processing returns to step 606 to accept the entry of password. If the password text is correct, then at step 612, a check is made as to whether rhythm checking is enabled. If rhythm checking is not enabled, then at step 614 the password is accepted and a "Password accepted" message is displayed in the message box (214 in FIG. 7) and an indication (702 in FIG. 7) is displayed that the password is accepted.

Figure 9:
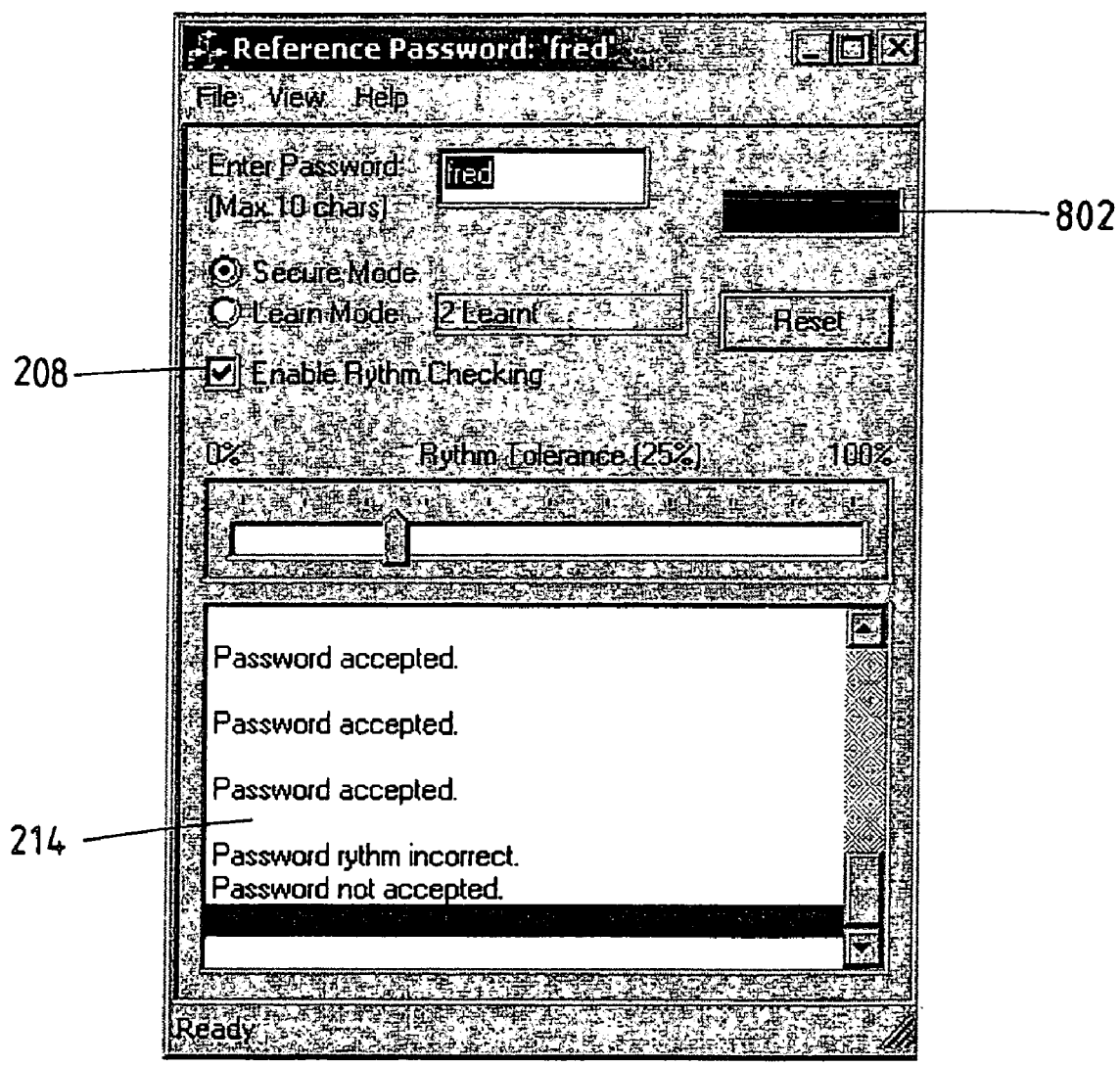
FIG. 9 is a screen image of the error indication displayed at step 618 of FIG. 6.

If rhythm checking is enabled, then at step 616, the individual time intervals are checked to see if they fall within the respective ranges for those time intervals. If any of the time intervals do not fall within the acceptable ranges, then "Password rhythm incorrect" and "Password not accepted" messages are displayed in the message box (214 in FIG. 9) and an indication (802 in FIG. 9) is provided that the password is not accepted. Processing returns to step 606 to accept the entry of password. If all of the time intervals fall within the acceptable ranges, then at step 620 the password is accepted and a "Password accepted" message is displayed in the message box (214 in FIG. 7) and an indication (702 in FIG. 7) is displayed that the password is accepted.

In addition to checking the rhythm of entry of the password, the tempo is checked. As used herein, "tempo" is intended to mean relative measures of the time interval between the entry of each character or number of a password, code or identification number. That is, for example, if the characters being entered are "fred", then the interval between entering "f" and "r" might be 203 mS, the interval between entering "r" and "e" might also be 203 mS and the interval between entering "e" and "d" might be 156 mS. The first inter-character interval, that is, the interval between entering "f" and "r", may be used as an "anchor" for checking the relative timing for the rest of the password. The second and subsequent inter-character intervals are divided by this first interval to give values for the tempo. So the Tempo value for the interval between entering "r" and "e" would be 203 mS divided by 203 mS, that is 1.00 and the Tempo value for the interval between entering "e" and "d" might be 156 mS divided by 203 mS, that is 0.77.

In an alternative embodiment, the average of the inter-character intervals may be used as an "anchor".

Also, as used herein, "Tempo Tolerance" is taken to mean the variation from these Tempo (relative) values that are permitted for the rhythm of the entry of the password, code or identification number to be accepted. For example, using the intervals mentioned above, with a Tempo Tolerance of 25%, a Tempo value of 0.75 to 1.25 (1.00 plus or minus 25%) might be acceptable for the interval between entering "r" and "e" and a range of 0.58 to 0.96 (0.77 plus or minus 25%) might be acceptable for the interval between entering "e" and "d".

As for the rhythm aspect of password entry, the system into which the password is entered must learn the tempo associated with a password when it is first entered. The system does this by using a Learning Mode and a Secure Mode in which the password is entered and the tempo is learned.

Figure 10:
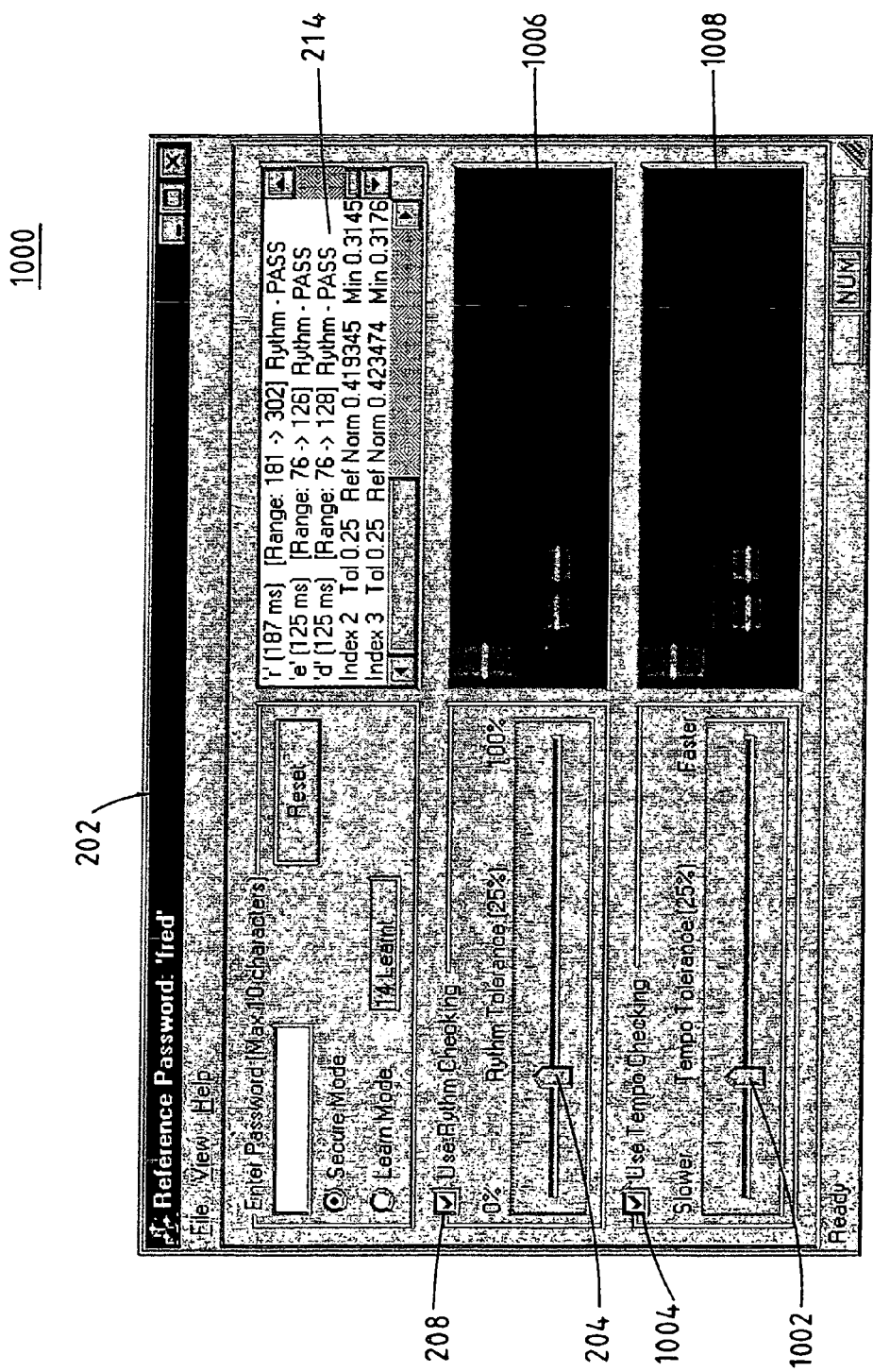
FIG. 10 is a screen image of the tempo checking portion of the present invention.

FIG. 10 shows a program window 1000 with a window title 202 of "Reference Password: fred". A Rhythm Tolerance slider 204 is set to an initial value of 25% and a Tempo Tolerance slider 1002 is set to an initial value of 25%. Tick-box 1004 is included to enable Tempo checking. Message window 214 shows the elapsed time interval between entry of each character in ms, the range that is acceptable and whether the time interval is within the acceptable range. Additionally or alternatively for this embodiment, the reference tempo is shown, together with the minimum and maximum values and whether or not the tempo is within the tolerance range.

Additionally, the embodiment of FIG. 10 includes a graphical display 1006 of the rhythm and a graphical display 1008 of the tempo. The nominal value is shown together with the acceptable range. Additionally, the actual value for this entry is shown. It can then be seen graphically whether or not the actual value falls within the accepted range.

FIGS. 2 to 5 and 7 to 10 and the associated description describe an embodiment that is a demonstration of the principles of the present invention. Considerable feedback is provided to the user in the embodiments described in order for the user to understand how the invention works and in order to allow the reader of this specification to fully understand the invention. Practical implementations of the invention however, though claimed herein, are not likely to include or require each and all of the heretofore explainede features. For example, it is unlikely that the window title of a practical implementation would include the test of the password itself.

Further, this password text has been included for exemplary purposes only. While the embodiments described might be implemented in a manner similar to that described for the learning mode, the secure mode a minimal user interface is likely to be used with the user merely being asked to provide a password and being informed whether or not that password has been accepted, without being told why it was not accepted. However, the principles of FIGS. 1 and 6 are likely to be implemented.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A computer readable medium bearing logic executable by a computer for:

receiving, from a user, a unique identifier, the unique identifier comprising both a sequence of keystrokes and inter-keystroke intervals associated with provision of those keystrokes;

comparing the unique identifier received from the user with a reference unique identifier by:

comparing the sequence with a sequence from the reference unique identifier to render a sequence comparison;

comparing at least one absolute inter-keystroke interval of the unique identifier with a respective absolute inter-keystroke interval of the reference unique identifier to render an absolute comparison and returning a true indication if the absolute inter-keystroke interval of the unique identifier is within a predetermined tolerance of the absolute inter-keystroke interval of the reference identifier;

comparing at least one relative inter-keystroke interval of the unique identifier, the relative inter-keystroke interval being a ratio of an absolute inter-keystroke interval in the unique identifier to a predetermined absolute inter-keystroke interval in the unique identifier, with a respective reference relative inter-keystroke interval of the reference unique identifier, the reference relative inter-keystroke interval being a ratio of an absolute inter-keystroke interval in the reference unique identifier to a predetermined absolute inter-keystroke interval in the reference unique identifier, to render a relative comparison and returning a true indication if the relative inter-keystroke interval of the unique identifier is within a predetermined tolerance of the relative inter-keystroke interval of the reference identifier; and authenticating said user if the sequence comparison, the absolute comparison, and said relative comparison all return a true indication, further comprising the step of entry by the user of the reference unique identifier, wherein said predetermined tolerance is explicitly provided by the user during said step of entry by the user of the reference unique identifier.

2. A computer readable medium as claimed in claim 1, wherein the unique identifier is provided by directly by the user.

* * * * *